(12) United States Patent
Yang et al.

(10) Patent No.: US 7,566,434 B1
(45) Date of Patent: Jul. 28, 2009

(54) SPHEROIDAL AGGREGATES COMPRISING SINGLE-WALL CARBON NANOTUBES AND METHOD FOR MAKING THE SAME

(75) Inventors: Yuemei Yang, Houston, TX (US); Martin Grosboll, Kingwood, TX (US); Eduardo Vega, Jr., Katy, TX (US)

(73) Assignee: Unidym, Inc., Menlo Park, CA (US)

( * ) Notice: Subject to any disclaimer, the term of this patent is extended or adjusted under 35 U.S.C. 154(b) by 503 days.

(21) Appl. No.: 11/533,437

(22) Filed: Sep. 20, 2006

Related U.S. Application Data

(62) Division of application No. 10/405,102, filed on Apr. 1, 2003, now Pat. No. 7,135,160.

(60) Provisional application No. 60/369,387, filed on Apr. 2, 2002.

(51) Int. Cl.
*C01B 31/02* (2006.01)

(52) U.S. Cl. ............. 423/461; 423/447.1; 423/447.2; 977/845

(58) Field of Classification Search ............. 423/447.1, 423/447.2, 447.3, 461; 977/746, 845
See application file for complete search history.

(56) References Cited

U.S. PATENT DOCUMENTS

| | | | | |
|---|---|---|---|---|
| 5,560,898 | A * | 10/1996 | Uchida et al. | 423/461 |
| 6,239,547 | B1 * | 5/2001 | Uemura et al. | 313/495 |
| 6,723,299 | B1 * | 4/2004 | Chen et al. | 423/447.1 |
| 6,790,426 | B1 * | 9/2004 | Ohsaki | 423/447.2 |
| 7,029,645 | B2 * | 4/2006 | Burgin | 423/447.1 |
| 2002/0106541 | A1 * | 8/2002 | Yamada et al. | 429/21 |
| 2002/0192143 | A1 * | 12/2002 | Miyazawa et al. | 423/447.2 |

FOREIGN PATENT DOCUMENTS

| WO | WO02/064868 | 8/2002 |
|---|---|---|
| WO | WO02/064869 | 8/2002 |

OTHER PUBLICATIONS

Ausman, K. D., et al., "Organic Solvent Dispersions of Single-Walled Carbon Nanotubes: Toward Solutions of Pristine Nanotubes," Sep. 28, 2000, American Chemical Society, The Journal of Physical Chemistry B, vol. 104, No. 38, pp. 8911-8915.*
Bandow, S. et al., "Purification and Magnetic Properties of Carbon Nanotubes," 1998, Springer-Vedag, Applied Physics A, Materials Science and Processing, vol. 67, pp. 23-27.*
Chen, Y., et al., "Solution-Phase EPR Studies of Single-Walled Carbon Nanotubes," Jan. 22, 1999, Elsevier, Chemical Physics Letters, vol. 299, pp. 523-535.*
Yakobson et al., "Fullerene Nanotubes: $C_{1,000,000}$ and Beyond," *American Scientist* 85:324-337 (1997).
Dresselhaus et al., "$C_{60}$-Related Tubules and Spherules," *Science of Fullerenes and Carbon Nanotubes*, San Diego: Academic Press, Ch. 19(1996).
Ausman et al., *The Journal of Physical Chemistry B* 104:8911-8915 (Sep. 28, 2000).
Bandow et al., *Applied Phyics A, Materials Science & Processing* 67:23-27 (1998).
Chen et al., *Chemical Physics Letters* 299:532-535 (Jan. 22, 1999).

* cited by examiner

*Primary Examiner*—Stanley Silverman
*Assistant Examiner*—Daniel C. McCracken
(74) *Attorney, Agent, or Firm*—Williams, Morgan & Amerson, P.C.

(57) ABSTRACT

A method for separating single-wall carbon nanotubes from an aqueous slurry comprises adding a water-immiscible organic solvent to an aqueous slurry comprising single-wall carbon nanotubes, isolating at least some of the single-wall carbon nanotubes in the solvent, and removing the solvent from the single-wall carbon nanotubes to form dried single-wall carbon nanotubes. A spheroidal aggregate of single-wall carbon nanotubes is formed wherein the aggregate is approximately spherical and has a diameter in a range of about 0.1 and about 5 mm, and wherein the aggregate contains at least about 80 wt % single-wall carbon nanotubes. The spheroidal aggregates of single-wall carbon nanotubes are easily handled in industrial processes and are redispersable to single-wall carbon nanotubes and/or ropes of single-wall carbon nanotubes. This invention can also be applied to multi-wall carbon nanotubes.

29 Claims, No Drawings

SPHEROIDAL AGGREGATES COMPRISING SINGLE-WALL CARBON NANOTUBES AND METHOD FOR MAKING THE SAME

CROSS-REFERENCE TO RELATED APPLICATION

This application is a divisional of Ser. No. 10/405,102, filed Apr. 1, 2003, now U.S. Pat. No. 7,135,160 which claims priority from U.S. provisional application Ser. No. 60/369,387, filed Apr. 2, 2002, which application is incorporated herein by reference.

FIELD OF THE INVENTION

This invention relates generally to carbon nanotubes, more particularly to single-wall carbon nanotubes, and more particularly to a form of single-wall carbon nanotubes convenient for handling and processing, and method for making the same.

BACKGROUND OF THE INVENTION

Single-wall carbon nanotubes (SWNT), commonly known as "buckytubes," have unique properties, including high strength, stiffness, thermal and electrical conductivity. SWNT are hollow, tubular fullerene molecules consisting essentially of $sp^2$-hybridized carbon atoms typically arranged in hexagons and pentagons. Single-wall carbon nanotubes typically have diameters in the range of about 0.5 nanometers (nm) and about 3.5 nm, and lengths usually greater than about 50 nm. Background information on single-wall carbon nanotubes can be found in B. I. Yakobson and R. E. Smalley, *American Scientist*, Vol. 85, July-August, 1997, pp. 324-337 and Dresselhaus, et al., *Science of Fullerenes and Carbon Nanotubes*, 1996, San Diego: Academic Press, Ch. 19. Multi-wall carbon nanotubes appear as multiple concentric shells of carbon nanotubes and have some properties similar to single-wall carbon nanotubes. Multi-wall carbon nanotubes generally have diameters greater than about 3.5 nm and have many more defects in their carbon walls.

Single-wall carbon nanotubes are generally made in high-temperature processes using a carbon source and a metallic catalyst, typically comprising Group VIb and/or Group VIIIb transition metals. Methods for synthesizing single-wall carbon nanotubes include DC arc processes, laser vaporization of graphite doped with transition metal atoms, high temperature, high pressure gas-phase syntheses involving a carbon-containing feedstock gas, such as carbon monoxide, and a volatile transition metal catalyst precursor, and chemical vapor deposition (CVD) processes in which single-wall carbon nanotubes are formed from a carbon-containing gas on nanometer-scale metal catalyst particles, which can be supported on a substrate or catalyst support.

The single-wall carbon nanotube product that results from these processes generally is in the form of black soot and, typically, the soot is fluffy or powdery. Fine and fluffy powders can easily become airborne and can often be difficult to handle in industrial processes.

In addition to single-wall carbon nanotubes, the products from these processes also comprise transition metal catalyst residues and carbon not in the form of single-wall carbon nanotubes, such as amorphous carbon, partially formed single-wall carbon nanotubes, and, in some cases, multi-wall carbon nanotubes. The SWNT-containing product from supported-catalyst CVD processes can also comprise a substrate or support material. The distribution of reaction products will vary depending on the particular process used and the operating conditions used in the process.

For many applications, a purified single-wall carbon nanotube product is preferred. Procedures to purify single-wall carbon nanotubes are directed at removing carbon not in the form of single-wall carbon nanotubes, metallic catalyst residues and, in the case of CVD processes, catalyst support material. Procedures for purifying single-wall carbon nanotubes often involve acids that react with the metal residues. Such procedures can be "wet" methods, such as those involving aqueous acid solutions, or "dry" methods that employ gaseous acids, e.g. HCl in vapor form. Examples of wet and dry methods for purifying single-wall carbon nanotubes are related in International Patent Publications "Process for Purifying Single-Wall Carbon Nanotubes and Compositions Thereof," WO 02/064,869 published Aug. 8, 2002, and "Gas Phase Process for Purifying Single-Wall Carbon Nanotubes and Compositions Thereof," WO 02/064,868 published Aug. 8, 2002, respectively, and included herein in their entirety by reference.

Although wet and dry purification procedures can yield purified single-wall carbon nanotubes, the resulting form of the single-wall carbon nanotubes can be difficult to handle in industrial processes. Similar to the form of as-produced single-wall carbon nanotubes, gas-phase purification techniques often result in a fluffy, fine powdery product. Wet purification procedures often involve formation of an aqueous slurry of single-wall carbon nanotubes. Separation of the purified single-wall carbon nanotubes from the aqueous phase, often done by filtration or centrifugation, is typically slow and tedious, and often results in matted, compressed and dense forms of single-wall carbon nanotubes, such as mats, papers and chunks, that are difficult to redisperse in subsequent processes.

An effective method for fast, efficient separation of single-wall carbon nanotubes from aqueous slurry is, therefore, desirable. Also needed is a purified form of single-wall carbon nanotubes that is easier to handle than fine powders.

SUMMARY OF THE INVENTION

In one embodiment, the invention relates to an aggregate comprising single-wall carbon nanotubes wherein the aggregate is spheroidal and has a diameter in a range of about 0.5 and about 2 mm, and wherein the aggregate contains at least about 80 wt % single-wall carbon nanotubes. In another embodiment, the invention relates to a method for efficiently and quickly separating single-wall carbon nanotubes from an aqueous slurry, comprising adding a water-immiscible organic solvent to an aqueous slurry comprising single-wall carbon nanotubes, isolating at least some of the single-wall carbon nanotubes in the solvent, and removing the solvent from the single-wall carbon nanotubes to form dried single-wall carbon nanotubes. In yet another embodiment, the invention relates to a method for forming spheroidal aggregates of single-wall carbon nanotubes comprising adding a water-immiscible organic solvent to an aqueous slurry comprising single-wall carbon nanotubes, forming aggregates of single-wall carbon nanotubes in the solvent, and removing the solvent from the aggregates to form spheroidal aggregates of dried single-wall carbon nanotubes. Note "dried" carbon nanotubes shall mean nanotubes containing not more than about 20 wt % solvent.

In another embodiment, the invention relates to an aggregate comprising multi-wall carbon nanotubes wherein the aggregate is spheroidal and has a diameter in a range of about 0.5 and about 2 mm, and wherein the aggregate contains at least about 80 wt % multi-wall carbon nanotubes. In another embodiment, the invention also relates to a method for efficiently and quickly separating multi-wall carbon nanotubes from an aqueous slurry, comprising adding a water-immiscible organic solvent to an aqueous slurry comprising multi-wall carbon nanotubes, isolating at least some of the carbon nanotubes in the solvent, and removing the solvent from the carbon nanotubes to form dried multi-wall carbon nanotubes. Yet another embodiment of the invention relates to a method for forming spheroidal aggregates of multi-wall carbon nanotubes comprising adding a water-immiscible organic solvent to an aqueous slurry comprising multi-wall carbon nanotubes, forming aggregates of multi-wall carbon nanotubes in the solvent, and removing the solvent from the aggregates to form spheroidal aggregates of dried multi-wall carbon nanotubes.

The spheroidal aggregates of single-wall carbon nanotubes are easily handled in industrial processes and are redispersable to single-wall carbon nanotubes and/or ropes of single-wall carbon nanotubes. The spheroidal aggregates of multi-wall carbon nanotubes are also easily handled in industrial processes and are redispersible to individual multi-wall carbon nanotubes.

DETAILED DESCRIPTION OF SPECIFIC EMBODIMENTS

One embodiment of the invention relates to a method for efficiently and quickly separating single-wall carbon nanotubes from an aqueous slurry, comprising adding a water-immiscible organic solvent to an aqueous slurry comprising single-wall carbon nanotubes, isolating at least some of the single-wall carbon nanotubes in the solvent, and removing the solvent from the single-wall carbon nanotubes to form dried single-wall carbon nanotubes. Another embodiment of the present invention relates to a method for forming spheroidal aggregates of single-wall carbon nanotubes comprising adding a water-immiscible organic solvent to an aqueous slurry comprising single-wall carbon nanotubes, forming aggregates of single-wall carbon nanotubes in the solvent, and removing the solvent from the aggregates to form spheroidal particles of dried single-wall carbon nanotubes. The procedures of this invention can also be applied to multi-wall carbon nanotubes. In this embodiment, the multi-wall carbon nanotubes can be easily separated from an aqueous phase using a water-immiscible solvent. Likewise, spheroidal aggregates of multi-wall carbon nanotubes can be formed in the process of extraction with the water-immiscible solvent. The spheroidal aggregates of multi-wall carbon nanotubes are convenient to handle in industrial processes.

Single-wall carbon nanotubes may be made by any known method. Optionally, the single-wall carbon nanotube product may be purified by any known method.

In one embodiment of this invention, single-wall carbon nanotubes are separated from an aqueous slurry by extracting them with a hydrocarbon solvent. In the process of separation, the single-wall carbon nanotubes migrate into the solvent and aggregate. The migration and aggregation are facilitated by shaking or agitation means, such as, but not limited to, stirring. By using a water-immiscible solvent, the aqueous and the water-immiscible phases separate and either of the phases can easily be separated from the other using known means, such as by decanting, or the use of separatory means, such as a separatory funnel. Finally, the solvent is removed from the aggregates of single-wall carbon nanotubes, by drying means, such as but not limited to, evaporation, vacuum drying, convective drying, and combinations thereof. The diameters of the spheroids are generally in the range of about 0.1 mm and about 5 mm, preferably in the range of about 0.5 mm and about 2 mm. In contrast to drying single-wall carbon nanotubes from aqueous media, which results in compressed mats, bucky paper, chunks, and the like, the drying of single-wall carbon nanotubes from solvent results in a form in which the single-wall carbon nanotubes can be readily dispersed by known means, such as, but not limited to, sonication, heating or refluxing in a hydrocarbon solvent.

The procedure for forming the spheroidal aggregates of single-wall carbon nanotubes involves adding an organic solvent to an aqueous slurry containing single-wall carbon nanotubes and mixing, or applying other agitation means to, the slurry-solvent mixture. (Note that the term "spheroidal" includes spheres and shapes that approximate spheres, such as ovoids.) The organic solvent chosen is one that has an affinity for the carbon nanotubes and is immiscible in water, such that an aqueous phase and an organic phase separate after mixing is stopped. Suitable organic solvents include, but are not limited to, linear aliphatic hydrocarbons, such as n-pentane, n-hexane, and n-octane, branched aliphatic, such as isooctane, and methylpentane, alkenes, alkynes, aromatic hydrocarbons, such as benzene, toluene and xylenes, oxygenated hydrocarbons, such as methyl ethyl ketone and aldehydes. Other suitable solvents include hydrocarbon oils, silicone oils, chlorinated hydrocarbons, such as chloroform and chlorinated solvents, such as carbon tetrachloride. Water-miscible solvents, such as acetone and low boiling alcohols, e.g. ethanol and propanol, that do not phase separate with water, are not suitable solvents for separating the carbon nanotubes. During agitation, the nanotubes migrate from the aqueous phase to the organic phase. Agitation can be by any known means, such as, for example, shaking, stirring, sonication, and combinations thereof. After agitation, the organic and aqueous phases are allowed to separate and the nanotubes remain entrained in the solvent phase. In the solvent, the nanotubes aggregate into small spheroids. If the nanotube-solvent phase is less dense than the aqueous phase, this nanotube-solvent phase floats to the top of the aqueous surface and can easily be decanted. Conversely, if the nanotube-solvent phase is denser and sinks to the bottom of the vessel, the aqueous phase can be decanted. Preferably, the organic solvent is less dense than water and has a high vapor pressure to facilitate drying.

The ratio of the amount of nanotubes and the amount of solvent can vary depending on factors, such as, but not limited to, the water-immiscible solvent used and the temperature. Generally, the ratio can be in the range of about 1 g nanotubes to about 0.1 ml solvent and about 1 g nanotubes to about 100 mls solvent, preferably in the range of 1 g nanotubes to about 1 ml solvent and about 1 g nanotubes and about 25 mls solvent.

If desired, the nanotube material and solvent may be subjected to multiple rinsings with water, aqueous media, alcohol, water-immiscible solvent or combinations thereof. Preferably, multiple rinsings are done with water or alcohol. More preferably, the rinsings are done with water or aqueous media in order to establish an aqueous phase and a water-immiscible phase that separate. After the nanotube-solvent phase is separated from the aqueous phase, purified nanotube material is recovered by removing the organic solvent and any minor amount of residual aqueous media. Removing the organic solvent and any minor amount of aqueous media can be done, for example, by evaporation, vacuum drying or oven drying. Optionally, low temperature heating can be applied. Generally, heating temperatures can be up to about 100° C. or the boiling point of the solvent.

Organic solvents with low water miscibility and the ability to phase separate from the aqueous phase are suitable for separating single-wall carbon nanotubes from aqueous media. Generally, solvents with low boiling points and high vapor pressures are preferable, as they evaporate easily from the single-wall carbon nanotubes and result in a dry single-wall carbon nanotube product.

The spheroidal aggregates of single-wall carbon nanotubes can be made in conjunction with purification of the single-wall carbon nanotubes.

If a dry purification procedure is used, the carbon nanotubes are slurried in an aqueous media after purification. Solvent is added to the aqueous slurry and the water slurry-solvent mixture is agitated. The nanotubes migrate from the aqueous media to the solvent. The agitated mixture is allowed to separate into an aqueous phase and a solvent phase containing the nanotubes. The aqueous phase is removed from the solvent phase, wherein the nanotubes form into spheroidal aggregates. Solvent in the nanotube aggregates is removed by evaporation, vacuum drying, convective oven drying and combinations thereof, with or without added heat. The resulting product is spheroidal aggregates of purified single-wall carbon nanotubes. Generally, the spheroidal aggregates have diameters in the range of about 0.1 mm and about 5 mm, more generally in the range of about 0.5 mm and about 2 mm.

If a wet purification procedure is used, the carbon nanotubes are slurried in an aqueous media as part of the purification process. In a wet purification process, the nanotubes are optionally heated in a gaseous oxidative environment in order to oxidize non-nanotube carbon, such as amorphous carbon. To remove metallic catalyst residues, the nanotubes are treated with an aqueous acid, such as aqueous hydrochloric acid. Regardless of the acid used, in a wet purification, the nanotubes are generally in an aqueous acidic medium wherein the acid reacts with the metallic impurities. After the metallic impurities react with the acid, the nanotubes are commonly rinsed with water or alcohol to remove metal-containing compounds. Conventionally, the rinsing and washing of the nanotubes would be done by filtering the nanotubes, slurrying them in fresh water or alcohol, and refiltering a number of times until the filtrate is clear and pH approximately neutral. The conventional process of washing and rinsing the nanotubes using filtering means is slow and tedious.

In one embodiment of the present invention, the filtering steps are replaced by solvent extraction. Solvent is added to the acidic aqueous slurry after the acid has reacted with the metal catalyst particles. The water slurry-solvent mixture is agitated, and, during agitation, the nanotubes migrate from the aqueous media to the solvent. The agitated mixture is allowed to separate into an aqueous phase and a solvent phase containing the nanotubes. The aqueous phase is separated from the solvent phase, wherein the nanotubes are in the form of spheroidal aggregates. Since some impurities can remain entrapped in the spheroidal aggregates after separation of the aqueous and non-aqueous phases, the entrapped impurities can be removed from the aggregates by reslurrying the aggregates with clean water, such as distilled water. In this embodiment, fresh water can be added to the spheroidal aggregates and the mixture agitated. In the agitation, the spheroidal aggregates break apart and allow entrapped impurities that may have been in the aggregates to be released into the water. The water slurry-nanotube-solvent mixture is again allowed to phase separate. The nanotubes again remain with the solvent phase and reform into spheroidal aggregates. The aqueous phase can then be removed by decanting or other means of separating two-phase liquids. The addition of fresh water and reslurrying can be repeated until the desired nanotube purity is obtained, and/or the water phase is clear and has the desired pH.

After the water phase is removed for the last time, the spheroidal nanotube aggregates will still contain solvent. Solvent in the nanotube aggregates can be removed by evaporation, vacuum drying, convective oven drying and combinations thereof, with or without added heat. The resulting product is spheroidal aggregates of purified single-wall carbon nanotubes. Generally, the spheroidal aggregates have diameters in the range of about 0.1 mm and about 5 mm, preferably in the range of about 0.5 mm and about 2 mm.

When purification procedures are used, the dried spherical beads are generally at least about 80 wt % single-wall carbon nanotubes. Preferably, the dried spherical beads are at least about 90 wt % single-wall carbon nanotubes. More preferably, the dried spherical beads are at least about 95 wt % single-wall carbon nanotubes.

In another embodiment, multi-wall carbon nanotubes are used instead of single-wall carbon nanotubes. The multi-wall carbon nanotubes are generally purified with wet purification methods because multi-wall carbon nanotubes are typically made with a metallic catalyst on a support, such as silica, alumina, and the like. In the purification, the metallic catalyst is reacted in an aqueous acidic medium. The nanotubes can be extracted with a water-immiscible solvent, such as those used for single-wall carbon nanotubes. Procedures used for extraction, multiple washings and rinsings, aggregate formation and solvent drying of single-wall carbon nanotubes can be applied to those for multi-wall carbon nanotubes. When purification procedures are used, the dried spherical beads are generally at least about 80 wt % multi-wall carbon nanotubes. Preferably, the dried spherical beads are at least about 90 wt % multi-wall carbon nanotubes. More preferably, the dried spherical beads are at least about 95 wt % multi-wall carbon nanotubes.

The resulting spheroidal aggregate or bead form of single-wall carbon nanotubes or multi-wall carbon nanotubes is generally easier to handle in industrial processes than fine, fluffy powders. The nanotubes in spheroidal aggregate form can also be readily redispersed with appropriate processing.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example demonstrates a method for preparing spheroidal aggregates of single-wall carbon nanotubes. In a glass vial, 100 mg of purified single-wall carbon nanotubes were agitated and suspended in 20 ml water. Two drops of hexane were added to the vial. (Note: The volume of 20 drops of water is approximately one milliliter. This correspondence will also be used for hexane, e.g. two drops hexane have an approximate volume of 0.1 ml hexane. Thus, the ratio of nanotubes to hexane is approximately 0.1 g to 0.1 ml, or alternatively 1 g nanotubes to 1 ml hexane.) The vial was shaken vigorously for 1 minute. During agitation the nanotubes migrated from the water into the hexane. Within 10 minutes after agitation, the hexane and water phases separated, and the nanotubes were contained in the hexane layer on top of the water.

EXAMPLE 2

This example demonstrates a method for purifying single-wall carbon nanotubes and preparing spheroidal aggregates of the nanotubes.

Step 1: Oxidation 30 grams of as-produced single-wall carbon nanotubes, made by gas-phase, high-temperature, high-pressure disproportionation of carbon monoxide, were heated for one hour at 250° C. in moist air to oxidize amorphous carbon and carbon nanotube impurities.

Step 2: Acid Treatment

After oxidation, the single-wall nanotube product was mixed with 7 to 8 wt % aqueous HCl solution for about 4 hours, using about 1 liter HCl solution per 5 grams of oxidized single-wall carbon nanotube material to form a slurry of acid-treated single-wall carbon nanotubes.

Step 3: Acid Dilution

The slurry of acid-treated single-wall carbon nanotubes was poured into a larger container. Distilled water in the amount of about 10 times the volume of the slurry of acid-treated single-wall carbon nanotubes was added to the acid-treated single-wall carbon nanotube slurry and mixed. The resulting mixture was allowed to stand for about 30 min. The single-wall carbon nanotubes settled to the bottom and the acidic water was decanted off. The step of diluting the acid by water addition, mixing, standing and decanting was repeated until the pH of the final decanted slurry was greater than pH 4.

Step 4: Rinsing and Drying

About 1 liter of the decanted single-wall carbon nanotube slurry was poured into a separatory funnel. 400 mls of hexane (practical grade, Spectrum Chemical Co.) was added to the funnel. (Note: The ratio of nanotubes to hexane in this example is 30 g nanotubes to 400 mls hexane, or alternatively, approximately 1 g nanotubes to 13.3 mls hexane.) The mixture was shaken for 30 seconds, and allowed to separate into an aqueous phase and an organic phase. The single-wall carbon nanotubes migrated from the water phase to the organic phase and formed into spheres, approximately 1 mm to 3 mm in diameter. The aqueous phase was then drained. The separatory funnel was filled with more distilled water to fill the funnel to about 1 liter, shaken and drained again. The spheroidal aggregates of single-wall carbon nanotubes were placed in trays in a fume hood for about 10 minutes to permit some of the solvent to evaporate. The trays were then placed in a drying convection oven for 2 hours at 80° C. to evaporate the rest of the solvent. After drying, the single-wall carbon nanotubes were in the form of spheroidal aggregates having diameters in the range from about 0.5 mm to about 2.0 mm. The individual spheroidal aggregates did not agglomerate into larger aggregates.

The spheroidal aggregates were readily redispersible into individual single-wall carbon nanotubes or ropes of single-wall carbon nanotubes either by sonication or by heating in solvents, such as hexane, methyl ethyl ketone or other hydrocarbon solvent.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for separating multi-wall carbon nanotubes from an aqueous slurry, comprising:
    a) adding a water-immiscible organic solvent to an aqueous slurry comprising multi-wall carbon nanotubes;
    b) isolating at least some of the multi-wall carbon nanotubes in the solvent; and
    c) removing the solvent from the multi-wall carbon nanotubes to form dried multi-wall carbon nanotubes.

2. The method of claim 1 wherein the isolating forms spheroidal aggregates of multi-wall carbon nanotubes.

3. The method of claim 1 wherein the dried multi-wall carbon nanotubes are in the shape of spheroidal aggregates having diameters in the range of about 0.1 mm and about 5 mm.

4. The method of claim 1 wherein the dried multi-wall carbon nanotubes are in the shape of spheroidal aggregates having diameters in the range of about 0.5 mm and about 2 mm.

5. The method of claim 1 wherein the dried multi-wall carbon nanotubes are in the shape of spheroidal aggregates wherein the spheroidal aggregates comprise at least about 80 wt % multi-wall carbon nanotubes.

6. The method of claim 1 wherein the dried multi-wall carbon nanotubes are in the shape of spheroidal aggregates wherein the spheroidal aggregates comprise at least about 90 wt % multi-wall carbon nanotubes.

7. The method of claim 1 wherein the dried multi-wall carbon nanotubes are in the shape of spheroidal aggregates wherein the spheroidal aggregates comprise at least about 95 wt % multi-wall carbon nanotubes.

8. The method of claim 1 wherein the removing step is done by a procedure selected from the group consisting of evaporation, vacuum drying, convective drying and combinations thereof.

9. The method of claim 1 wherein the organic solvent comprises a solvent selected from the group consisting of hydrocarbons, oxygenated hydrocarbons, aliphatic solvents, aromatic solvents, alkanes, alkenes, alkynes, chlorinated hydrocarbons, chlorinated solvents, silicone oils, hydrocarbon oils, and combinations thereof.

10. The method of claim 1 wherein the organic solvent comprises hexane.

11. The method of claim 1 wherein the organic solvent comprises octane.

12. The method of claim 1 wherein the nanotubes and the solvent are present in a ratio from about 1 g nanotubes to about 0.1 ml solvent to about 1 g nanotubes to about 100 mls solvent.

13. The method of claim 1 wherein the nanotubes and the solvent are present in a ratio from about 1 g nanotubes to about 1 ml solvent to about 1 g nanotubes to about 25 mls solvent.

14. A method for forming spheroidal aggregates of multi-wall carbon nanotubes comprising:

a) adding a water-immiscible organic solvent to an aqueous slurry comprising multi-wall carbon nanotubes;
b) forming aggregates of multi-wall carbon nanotubes in the solvent; and
c) removing the solvent from the aggregates to form dried spheroidal aggregates of multi-wall carbon nanotubes.

15. The method of claim 14 wherein the dried spheroidal aggregates have a diameter in the range of about 0.1 mm and about 5 mm.

16. The method of claim 14 wherein the dried spheroidal aggregates have a diameter in the range of about 0.5 mm and about 2 mm.

17. The method of claim 14 wherein the solvent is removed by a procedure selected from the group consisting of evaporation, vacuum drying, convective drying and combinations thereof.

18. The method of claim 14 wherein the dried spheroidal aggregates contain at least about 80 wt % multi-wall carbon nanotubes.

19. The method of claim 14 wherein the dried spheroidal aggregates contain at least about 90 wt % multi-wall carbon nanotubes.

20. The method of claim 14 wherein the dried spheroidal aggregates contain at least about 95 wt % multi-wall carbon nanotubes.

21. The method of claim 14 wherein the organic solvent comprises a solvent selected from the group consisting of hydrocarbons, oxygenated hydrocarbons, aliphatic solvents, aromatic solvents, alkanes, alkenes, alkynes, chlorinated hydrocarbons, chlorinated solvents, silicone oils, hydrocarbon oils, and combinations thereof.

22. The method of claim 14 wherein the organic solvent comprises hexane.

23. The method of claim 14 wherein the organic solvent comprises octane.

24. The method of claim 14 wherein the nanotubes and the solvent are present in a ratio from about 1 g nanotubes to about 0.1 ml solvent to about 1 g nanotubes to about 100 mls solvent.

25. The method of claim 14 wherein the nanotubes and the solvent are present in a ratio from about 1 g nanotubes to about 1 ml solvent to about 1 g nanotubes to about 25 mls solvent.

26. An aggregate comprising multi-wall carbon nanotubes wherein the aggregate is spheroidal and has a diameter in a range of about 0.1 mm and about 5 mm, and wherein the aggregate contains at least about 80 wt % multi-wall carbon nanotubes.

27. The aggregate of claim 26 wherein the diameter is in the range of about 0.5 mm and about 2 mm.

28. The aggregate of claim 26 wherein the aggregate contains at least about 90 wt % multi-wall carbon nanotubes.

29. The aggregate of claim 26 wherein the aggregate contains at least about 95 wt % multi-wall carbon nanotubes.

* * * * *